Aug. 5, 1958  S. T. WILLIAMS  2,845,979
VALVE FOR TUBELESS TIRES
Filed June 16, 1954
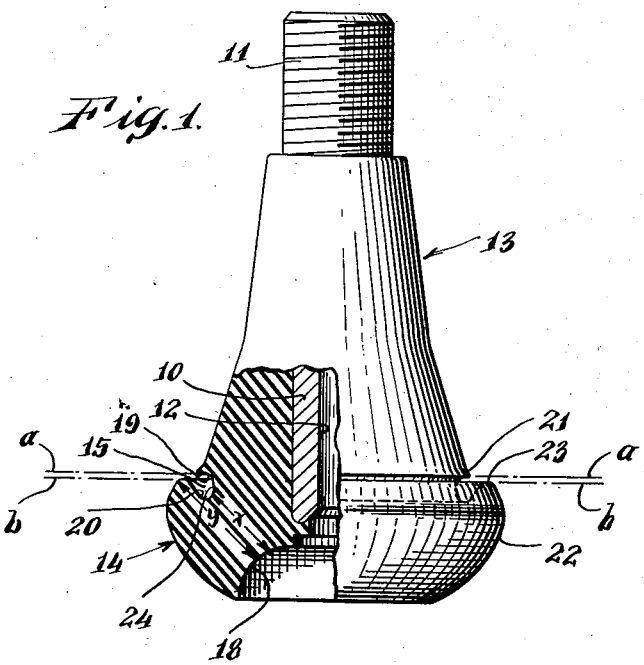
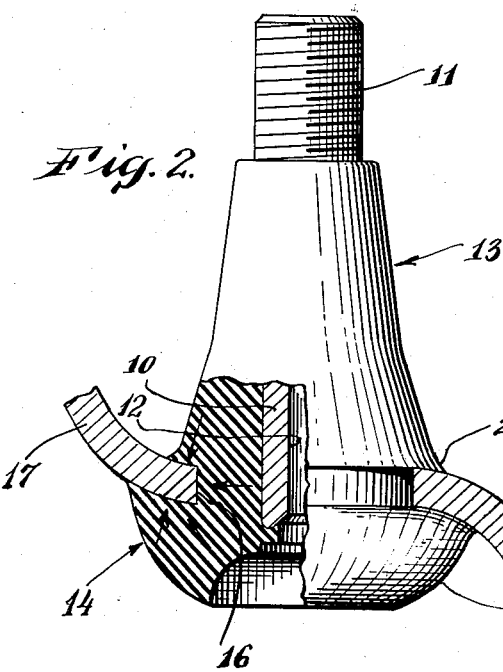
INVENTOR.
Selden T. Williams
BY
Churchill, Rich, Weymouth & Engel
ATTORNEYS.

2,845,979

VALVE FOR TUBELESS TIRES

Selden T. Williams, Bellerose, N. Y., assignor to Scovill Manufacturing Company, Waterbury, Conn., a corporation of Connecticut Application June 16, 1954, Serial No. 437,200

2 Claims. (Cl. 152—427)

The present invention relates to valve stems for tubeless pneumatic tires and aims to provide certain improvements therein. More particularly, it consitutes an improvement on the valve stem disclosed in my co-pending application, Serial No. 305,319, filed August 20, 1952.

In said prior application there is disclosed the broad concept of providing a snap-in valve stem for tubeless tires, said stem comprising a tubular metal insert interiorly formed to accommodate a standard valve insides or core and to which insert is adhesively bonded in coaxial encompassing relation an elastic, deformable, tubular housing having an enlarged base formed with an annular groove therein, the walls of said groove being so related and dimensioned that when the valve stem is forced through the valve stem opening in a wheel rim, said walls will engage the rim and securely hold the valve stem on the rim with an air-tight fit.

An object of the present invention is to provide a valve stem for tubeless tires having the general characteristics disclosed in said prior application but so modified as to insure a more effective seal with the rim notwithstanding irregularities in rim thickness and location of the opening in the rim for the valve stem.

A further object of the invention is to make the valve stem base of such hardness and configuration as to be yieldably deformable so that the walls of the groove therein will more closely conform to the ogee rim section contour under all operating conditions.

A still further object of the invention is to so form the bottom of the base as to permit the air pressure within the tire to be effective to contribute to maintaining the seal between the base and the rim.

The manner in which the foregoing and other objects of the invention not enumerated, are accomplished, will be understood by persons skilled in the art from the following detailed description when considered in connection with the accompanying drawings showing a preferred embodiment, wherein:

Figure 1 shows a side elevation of my improved valve stem for tubeless tires, part of the valve stem being broken away to better illustrate the construction thereof.

Fig. 2 shows the valve stem of Fig. 1 mounted on an ogee tire rim section.

Referring to the drawings, the valve stem comprises a tubular metal insert 10 having a conventional externally threaded nipple 11 and an internal chamber 12 adapted to accommodate a standard, replaceable valve insides or core (not shown), and in coaxial encompassing relation to said metal insert is adhesively bonded a housing 13 of elastomeric material formed with an enlarged, mushroom-shaped, deformable clamping base 14 having a peripheral groove 15 therein, the walls of said groove being so related that when the valve stem is forced through a valve stem opening 16 in a wheel rim 17, the walls of the groove will snugly engage the rim at said opening to securely hold the valve stem onto the rim with an air-tight fit.

The elastomeric housing 13 is exteriorly preferably generally tapered from the valve nipple 11 to the peripheral groove in the clamping base and the major portion of said length of smaller diameter than the opening 16 in the rim so as to readily pass therethrough and extends to at least, and preferably beyond, the lower region of the tubular metal insert 10 and is formed in its bottom with an enlarged axial recess 18 communicating with the bore of the insert. The peripheral groove 15 is of substantially C-shape in radial section having a continuous curved wall with the free edges of the upper wall 19 and lower wall 20 approaching each other as they extend outwardly from the groove. Preferably the C-shaped groove has a continuous curved wall free from sharp corners and the bottom or base of the groove 24 is of somewhat larger diameter than the opening 16 in the rim. The peripheral groove 15 may be said to divide the enlarged base into an upper portion 21 and a lower portion 22. The upper wall 19 of the groove is of less radial dimension than the lower wall 20 and the latter, where it meets the peripheral wall of the base, provides an upwardly directed peripheral bead 23 which is spaced radially outwardly from the free edge of the upper wall 19 of the groove, and the top of the bead 23 and the free edge of the upper wall of the groove lie in parallel planes $a$, $a$, and $b$, $b$, which are axially spaced apart a distance substantially less than the thickness of the rim 17 onto which the valve stem is to be mounted. The recess 18 is of generally inverted cup-shape form and is of larger diameter than the metal insert 10, largest diameter being at the bottom of the lower portion of the base whereby the wall thickness $x$ of the base, measured along an angle of approximately 45° to the axis of the valve stem between the locus of the center of the groove 15 and the wall of the enlarged axial recess, is substantially less than the wall thickness $y$ of the base, measured along a corresponding angle between the upwardly directed peripheral bead 23 and the wall of the enlarged axial recess. The reduced wall thickness $x$ as compared to the wall thickness $y$, greatly augments the flexibility of the lower portion of the base and permits said base portion to adjust itself to the contour of the rim and form therewith an air-tight seal around the rim opening when the valve stem is mounted on the rim.

The valve stem may be inserted through the opening 16 in the wheel rim by being forced therethrough from the tire side of the rim, the elastomeric housing being preferably first coated with a suitable lubricant, such as soap solution. Such mounting may be accomplished by the use of any suitable tool adapted to engage the inner end of the metal insert 10 and apply pressure to force the tapered portion of the housing above the upper wall of groove 15 through the rim opening.

From a consideration of the valve stem construction hereinabove described and the relative dimensions of the parts thereof, it will be appreciated that when the upper portion of the base is forced into the opening in the rim, the free edge at the wall 19 will snap over the face of the rim opposite to that through which the valve stem is inserted, whereupon the walls of the groove 15 will engage the rim and securely hold the valve stem on the rim with an air-tight fit primarily by the tension of the elastomeric material and the stressed deformation thereof in proximity to the annular groove 15. This tension is indicated by the arrows shown on Fig. 2. Because of the enlarged recess 18 in the base, the elastomeric material of the base will readily conform to the shape of the rim and the lip portions at the peripheries of the walls 19 and 20 will make intimate contact with the faces of the rim. By virtue of the reduced thickness of the wall $x$, the air pressure within the tire would also contribute in a minor degree to promote such conformation and contribute to maintaining the air-tight seal between the lip portion of wall 20 and the rim when acted upon by the air pressure in a tire.

In carrying out the invention it will be understood that the elastomeric material of which the housing is formed should have a durometer hardness which will permit of a substantial "give" in the material so that the walls of the groove in the valve stem will closely conform to the rim contour under all operating conditions, notwithstanding that a portion of the valve stem base, under certain conditions, may engage within or over a bend of the ogee rim section connecting adjacent flanges thereof.

While I have shown and described but a single embodiment of my invention, it will be understood that I do not wish to be limited to the precise details of construction disclosed since changes may be made therein within the scope of mechanical and engineering skill without departing from the spirit of the invention as hereinafter claimed.

What I claim is:

1. A unitary snap-in valve stem for mounting in a valve stem opening in a wheel rim for a tubeless tire, said valve stem comprising a non-deformable tubular insert adapted to accommodate a valve insides or core, an elastic deformable housing coaxially encompassing, and bonded to the insert, and having an enlarged, mushroom-shaped base with an axial opening therethrough communicating with the bore of the insert, the housing being tapered axially outwardly from a point intermediate the length of the valve stem toward the base and of smaller diameter for a major portion of its length than an opening in the rim to facilitate introducing the valve stem through such opening from the tire or outer side of the rim, said enlarged base being formed adjacent its top with a peripheral groove of C-shape in radial section with the upper and lower opposed walls of the groove approaching each other at their free edges, the upper wall of the groove being of less radial dimension than the lower wall of the groove, the peripheral wall of the base at the free edge of the lower wall of the groove terminating in an upwardly axially extending peripheral bead which is spaced radially outwardly from the free edge of the upper wall of the groove, the top of the bead and the free edge of the upper wall of the groove lying in parallel planes spaced apart a distance substantially less than the thickness of a rim upon which the valve stem is to be mounted, the base of the groove throughout its axial dimension being of somewhat larger diameter than the opening in such rim, the axial opening through the base being of inverted cup-shape and of larger diameter than the insert at its inner end, whereby the wall thickness of the base contiguous to the enlarged recess measured along an angle of approximately 45° to the axis of the valve stem between the locus of the center of the C-shaped groove and the wall of the enlarged recess, is substantially less than the wall thickness of the base measured along a corresponding angle between the upwardly extending peripheral bead and the wall of the enlarged recess, the structure being such that when the valve stem above the base is forced through the opening in the rim and the upper portion of the base is then forced through said opening, the free edge of the upper portion of the base will snap over the face of the rim opposite to that through which the valve stem is inserted whereupon the walls of the groove will engage the opposite faces of the rim and the surface of the opening in the rim to securely hold the valve stem on the rim with an air-tight fit primarily by the elastic tension of the rubber under deformation.

2. A snap-in valve according to claim 1, wherein the C-shaped groove in radial section has a continuous curved wall.

References Cited in the file of this patent
UNITED STATES PATENTS

| | | |
|---|---|---|
| 1,915,249 | Jorgensen | June 20, 1933 |
| 2,038,473 | Bronson | Apr. 21, 1936 |
| 2,049,252 | Eberhard | July 28, 1936 |
| 2,308,952 | Ickes | Jan. 19, 1943 |
| 2,634,785 | Tubbs | Apr. 14, 1953 |
| 2,769,476 | Herzegh et al. | Nov. 6, 1956 |